United States Patent [19]

Kasai

[11] Patent Number: 4,809,559

[45] Date of Patent: Mar. 7, 1989

[54] DETECTOR FOR AN ELECTROMAGNETIC FLOWMETER

[75] Inventor: Syozo Kasai, Katsuta, Japan

[73] Assignee: Hitachi, Ltd., Tokyo, Japan

[21] Appl. No.: 179,982

[22] Filed: Apr. 11, 1988

[30] Foreign Application Priority Data

Apr. 11, 1987 [JP] Japan .................................. 62-89151

[51] Int. Cl.$^4$ .............................................. G01F 1/58
[52] U.S. Cl. .................................................. 73/861.12
[58] Field of Search ..................................... 73/861.12

[56] References Cited

U.S. PATENT DOCUMENTS 3,373,608  3/1968  Ketelsen ........................... 73/861.12
4,236,411  12/1980  Ketelsen ........................... 73/861.12

OTHER PUBLICATIONS

M. K. Bevir, "Long Induced Voltage electromagnetic flowmeters . . . " Journ. Mech. and App. Math, vol. XXIV, 1971, pp. 347-372.

D. C. Baker, "Principles and Practice of flow measurement", lecture 13a, May 1977.

Japanese Industrial Standard, (B 7554-1984), 1984.

*Primary Examiner*—Joseph A. Orsino
*Assistant Examiner*—Hollis T. Chen
*Attorney, Agent, or Firm*—Antonelli, Terry , Wands

[57] ABSTRACT

A detector for an electromagnetic flowmeter provided with a pair of detecting electrodes disposed opposite to each other on the inner surface of a piping, through which fluid, whose flow rate is to be measured, flows, and a magnet forming a magnetic field in the direction perpendicular both to the axis of the piping and to the line connecting the detecting electrodes, in which the magnet has a pair of magnetic poles, which are so formed that the magnetic flux density is greatest in the neighborhood of the position apart from the middle point of the straight line segment connecting the detecting electrodes by 0.3 d in the direction towards each of the detecting electrodes, d being the inner diameter of the piping.

5 Claims, 4 Drawing Sheets

DETECTOR FOR AN ELECTROMAGNETIC FLOWMETER

BACKGROUND OF THE INVENTION

This invention relates to a detector for an electromagnetic flowmeter and in particular to a detector for an electromagnetic flowmeter for measuring the flow rate of electrically conductive fluid.

The flow rate signal E of an electromagnetic flowmeter is expressed according to JIS (Japan Industrial Standard) B7554-1984 as follows:

$$E = kBdv \quad (1)$$

where
- k: short circuit coefficient,
- B: magnetic flux density,
- d: inner diameter of piping (distance between detecting electrodes), and
- v: flow speed.

Usually, in a detector, there are disposed a pair of detecting electrodes 2 on the left and the right walls of a piping 1, whose cross-section is circular, for taking-out electric signals representing the flow rate, as indicated in FIG. 3. The distance between the electrodes is nearly equal to the inner diameter of the piping, i.e. the detector. There are disposed magnetic poles in the up and down direction perpendicular both to the axis connecting the 2 detecting electrodes and to the direction, along which the fluid 3 flows (axial direction of the piping), which poles are connected with a yoke 5. Further, there are mounted a pair of exciting coils 6 on the magnetic poles 4, which are excited by a rectangular AC current so that a magnetic field is applied to the fluid 3. These magnetic poles 4 may be replaced by a permanent magnet. In this case not only the exciting coils are unnecessary and the structure is simpler, but also this structure is more convenient for measurements of the flow rate of fluids, for which it is undesirable to be heated, because there is no heat production due to exciting current. This arrangement of the electrodes 2 and the magnetic poles 4 gives rise to an electric signal E expressed by Eq. (1), representing the flow rate depending on the speed of the fluid 3, according to the Faraday's electromagnetic induction law. The magnetic flux density distribution produced by such magnetic poles has a shape indicated in FIG. 4. By the method for measuring this magnetic flux density the magnetic flux density in the direction along the y-axis (axis connecting the magnetic poles 4) of the detector indicated in FIG. 3 is measured as a distribution in the direction along the x-axis (axis connecting the detecting electrodes 2). FIG. 4 shows a result thus obtained. As indicated there, the magnetic flux density varies within the piping and also the detected magnitude of the flow rate signal E given by Eq. (1) varies within the piping.

Furthermore, the flow rate signal detected by the detecting electrode 2 varies, even if products of the magnetic flux density B and the flow speed v are equal, depending on the position within the piping. In this case, the degree, with which the flow rate signal produced at different locations within the piping is detected, is represented by a weighting factor W given by:

$$W(x,y) = \frac{d^4 + 4d^2(y^2 - x^2)}{d^4 + 8d^2(y^2 - x^2) + 16(x^2 + y^2)^2} \quad (2)$$

On the other hand the weighting factor W(x) for the magnitude of the signal produced in the x-direction by the magnetic field in the y-direction can be given by:

$$W(x) = \frac{d^4 - d^2(x^2 - y^2)}{d^4 + 2d^2(y^2 - x^2) + (x^2 + y^2)^2} \quad (3)$$

Putting d=1, Eq. (3) can be rewritten as follows:

$$W(x) = \frac{1 - (x^2 - y^2)}{1 + 2(y^2 - x^2) + (x^2 + y^2)^2} \quad (4)$$

The result obtained by calculating this equation, inserting values of x and y for various locations therein, is shown in FIG. 5. This figure is identical to that published in JIS B 7554 stated above. In the figure only the half above the x-axis is shown. As can be seen from the figure, the weighting factor is very great at the neighborhood of the detecting electrodes and therefore the flow rate signal is produced mainly by fluid flowing at the neighborhood of the inner surface of the piping.

FIG. 6 shows variations of the flow rate $\Delta Q$ flowing through a ring-shaped portion, whose radius varies, calculated by using the following formula;

$$\Delta Q = 2\pi \times r \times \Delta r \times v \quad (5)$$

where
- r: radius varying between O and d/2,
- $\Delta r$: increment of radius, and
- v: flow speed (constant)

As can be seen from FIG. 6, the flow rate $\Delta Q$ varies proportionally to the radius.

By the prior art detector described above the magnitude of the flow rate passing through different portions detected as the flow rate signal is determined, depending on the product $B \times W$ of the magnetic flux density distribution and the weighting factor indicated in FIG. 5.

In the case where the magnetic flux density distribution is uniform as indicated in FIG. 7, the product $B \times W$ can be represented by a bar graph as indicated in FIG. 8. As can be seen from this graph the flow rate signal detected by the electrodes is determined approximately by the flow rate at the neighborhood of the inner surface of the piping. For this reason, inspite of the fact that most of the fluid flows at the central portion of the piping, the flow rate at the central portion is almost not detected as the flow rate signal, which means that the real flow rate is not measured with fidelity. Furthermore turbulence is easily produced in the flow in the neighborhood of the inner surface of the piping and the flow rate signal is apt to be influenced by noises due to this turbulence. In addition it is apt to be influenced by noises due to dirtiness of the surface of the electrodes.

FIGS. 9 and 10 show variations of the magnetic flux density distribution and the product $B \times W$, respectively, with respect to the radial position in the detector indicated in FIG. 3. In this case also, it can be understood that the flow rate signal doesn't represent the flow rate at different portions with fidelity, although the relation is more or less improved in comparison with the case in FIGS. 7 and 8. Furthermore there is another problem that the flow rate signal is apt to be influenced by noises due to turbulence at the inner surface of the piping.

SUMMARY OF THE INVENTION

The object of this invention is to provide a detector for an electromagnetic flowmeter, which is capable of obtaining a flow rate signal representing the flow rate at different locations within a piping with a higher fidelity and reducing influences of the noises on the flow rate signal.

According to this invention, the detector for an electromagnetic flowmeter is provided with a pair of detecting electrodes disposed opposite to each other on the inner surface of the piping, through which fluid, whose flow rate is to be measured, flows, and magnet means forming a magnetic field, whose direction is perpendicular both to the axis of the piping and to the line connecting the detecting electrodes, and the magnet means includes a pair of magnetic poles, which are so disposed that the peak of the magnetic flux density is produced at a position apart from the middle point of the straight line segment connecting the detecting electrodes by 0.3d in the direction towards each of the detecting electrodes, d being the diameter of the piping.

DESCRIPTION OF THE PREFERRED EMBODIMENTS

Figure 6:
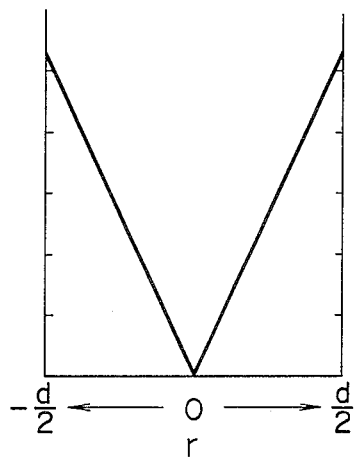
FIG. 6 shows a characteristic curve indicating variations of the flow rate with respect to the radial position of the piping for the case indicated in FIG. 5.
Figure 7:
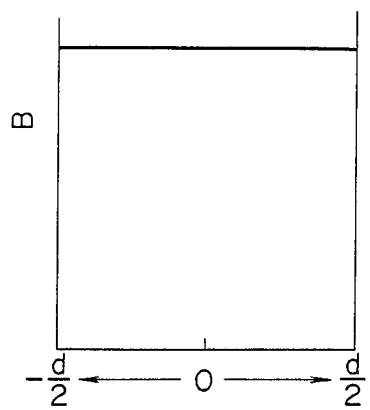
FIGS. 7, 9 and 11 show magnetic flux density distributions, when the flux density is uniform, when it is represented by the curve indicated in FIG. 4 and when it is represented by the curve indicated in FIG. 2, respectively.
Figure 8:
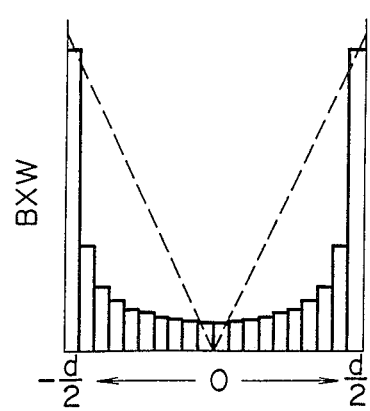
FIGS. 8, 10 and 12 are bar graphs representing $B \times W$ corresponding to FIGS. 7, 9 and 11, respectively.
Figure 9:
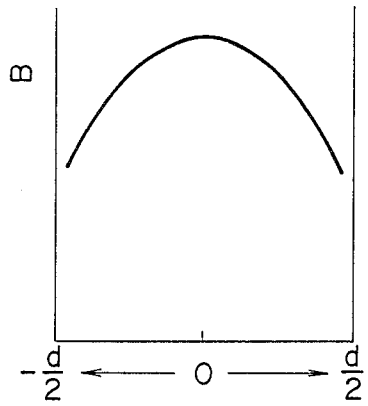
Figure 10:
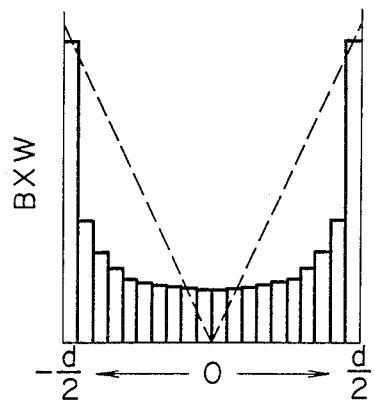

The flow rate distribution with respect to the radial position within the piping is represented by Eq. (5) and indicated in FIG. 6, when the flow speed is distributed uniformly within the whole piping. Consequently, if the distribution of the value of $B \times W$ representing the flow rate signal at various locations in the radial direction, detected by the detecting electrodes were in accordance with the flow rate distribution indicated in FIG. 6, a flow rate signal representing the flow rate at various locations with a high fidelity would be detected by the detecting electrodes. That is, the following equation representing the relation between the flow rate $\Delta Q$ at various portions given by Eq. (5) and the product $B \times W$ of the magnetic flux density B and the weighting factor W should be valid;

$$\Delta Q = K(B \times W) \tag{6}$$

where K is a proportionality constant.

Since $\Delta Q$ is given by Eq. (5) and W is represented by Eq. (4), when the remaining variable B is calculated by using Eq. (6), it is obtained as follows;

$$B = \frac{\Delta Q}{KW} = \frac{2\pi \cdot r \cdot \Delta r \cdot v}{K \cdot \frac{1 - (x^2 - y^2)}{1 + 2(y^2 - x^2) + (x^2 + y^2)^2}} \tag{7}$$

Now, considering only the magnetic flux density distribution on the straight line segment connecting the detecting electrodes, since $y=0$ and further $r=x$ in Eq. (7), the following equation can be obtained;

$$B = \frac{2\pi \cdot \Delta x \cdot v}{K} \cdot x(1 - x^2) \tag{8}$$

In order to obtain the maximum value of the magnetic flux density B, calculating the value of x satisfying $dB/dx = 0$, the following value is obtained;

$$x = \pm \frac{1}{\sqrt{3}} \approx \pm 0.6 \tag{9}$$

Eq. (9) means that it is necessary to have a magnetic flux density distribution having the peak value at a position apart from the center by about 0.6 towards each of the electrodes, the radius being equal to 1, in order to make the flow rate at various locations within the piping with fidelity in the flow rate signal. Now, designating the radius of the piping by d/2, the position where the magnetic flux density is maximum can be given by;

$$x = \pm \frac{d}{2\sqrt{3}} \approx 0.3d \tag{10}$$

Figure 11:
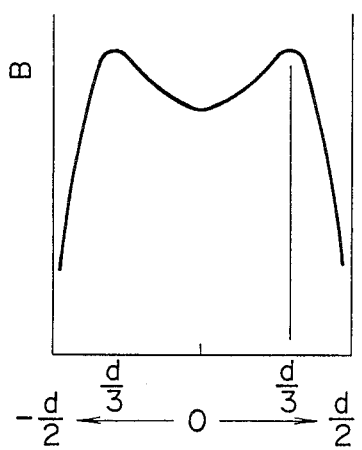
Figure 12:
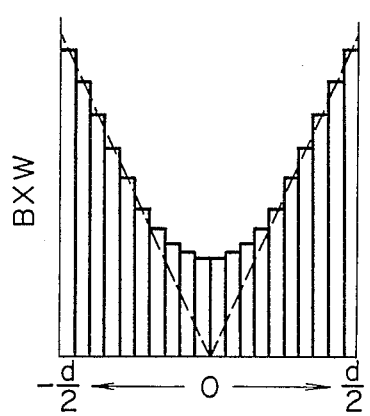
Figure 13:
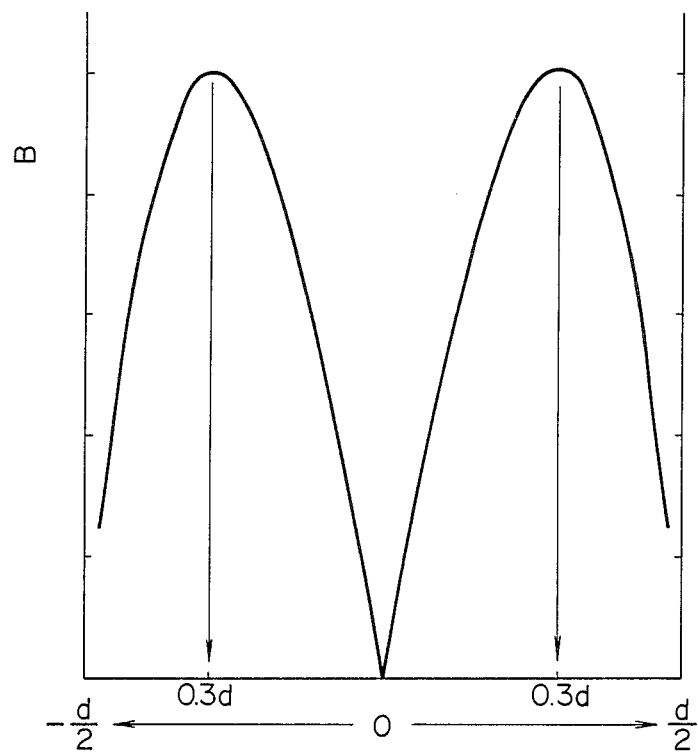
FIG. 13 indicates the most preferable magnetic flux density distribution.

FIG. 13 indicates such a magnetic flux density distribution. Since in reality it is difficult to realize the magnetic flux density indicated in FIG. 13, using a distribution as indicated in FIG. 11, values of $B \times W$ indicated in FIG. 12 are obtained. As it can be understood from FIG. 12, although there are some deviations at the central portion with respect to the flow rate distribution indicated by broken lines, it is possible to keep the difference therebetween below 10–15%.

An embodiment of this invention will be explained in detail, referring to FIGS. 1 and 2.

Figure 1:
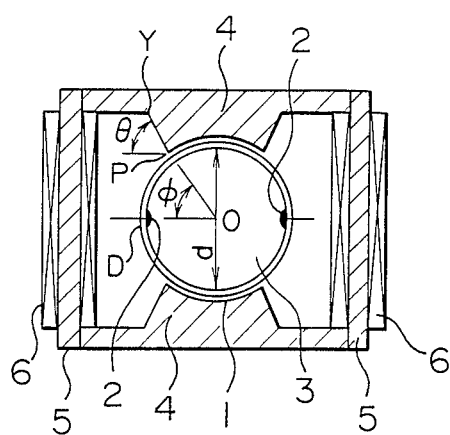
FIG. 1 is a cross-sectional view illustrating an embodiment of the detector for an electromagnetic flowmeter according to this invention.
Figure 2:
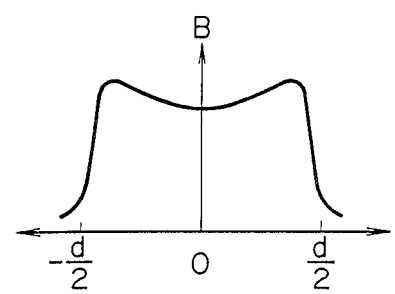
FIG. 2 is a graph showing a result obtained by measuring the magnetic flux density distribution in the magnetic circuit of the detector according to this invention.
Figure 3:
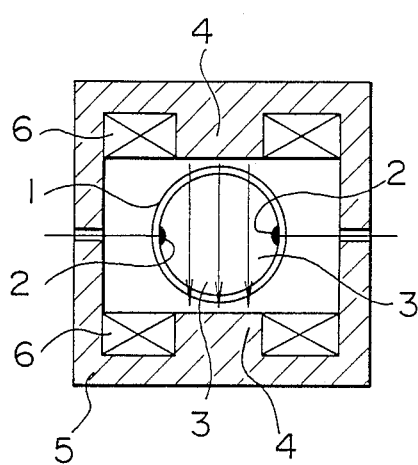
FIG. 3 is a cross-sectional view illustrating a prior art detector for an electromagnetic flowmeter.
Figure 4:
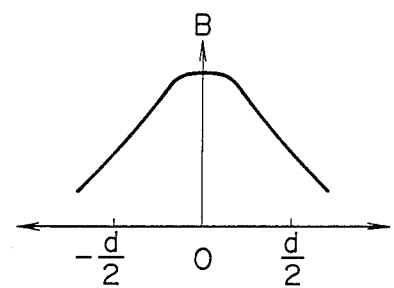
FIG. 4 is a graph showing the magnetic flux density distribution in the magnetic circuit of the detector indicated in FIG. 3.
Figure 5:
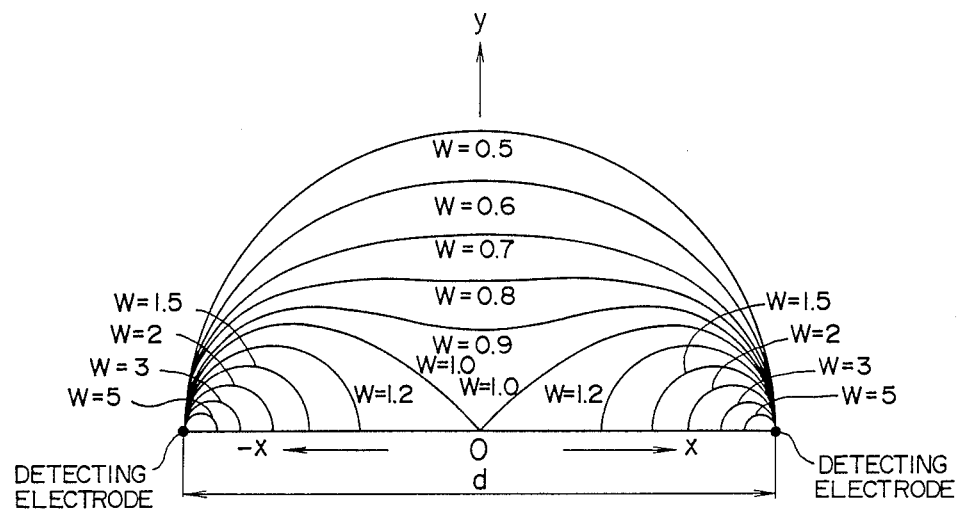
FIG. 5 is a graph showing a weighting function indicating the degree of the contribution of signals produced at various locations to the electrodes.

FIG. 1 is a cross-sectional view illustrating an embodiment of the detector for an electromagnetic flowmeter, in which reference numeral 1 is a piping, whose cross-section is circular; 2 represents a pair of detecting electrodes disposed on the left and the right sides of the piping 1 for taking-out electric signals; 3 indicates fluid; 4 represents magnetic poles disposed in the up and down direction, which is perpendicular both to the line connecting the detecting electrodes and to the flow direction of the fluid 3, which poles are connected by a yoke 5; and 6 indicates exciting coils.

Now various points within the detector are designated by different letters, i.e. the center of the piping by O, the detecting electrodes by D; the edges of the poles by P and the joints of the poles by Y. Further the angle formed by the line OP connecting an edge P of a pole and the center O of the piping and the line OD connecting a detecting electrode D and the center O of the piping be $\Phi$ and the angle formed by a side surface PY of a magnetic pole 4 and OD be $\theta$.

Condition 1

Taking the measurement precision of the detector, detection deviations of the flow rate due to deflection and turbulence within the piping, etc. into account, errors of 10-20% in the fidelity of the reflection of the flow rate at various locations within the piping in the detected value may be tolerated. Here the fidelity means the difference between $\Delta Q=2\pi r \cdot \Delta r \cdot v$ and $\Delta Q = K(B \times W)$ at various locations expressed in %. The tolerance region of ±20% of this fidelity of Eq. (10) is 0.255d−0.335d. Since the distance between the magnetic poles at the edge should be smallest in this region, $\Phi$ should satisfy;

$$\cos\Phi = \frac{0.255d}{0.5d} \sim \frac{0.335d}{0.5d} \tag{11}$$

Consequently the value of $\Phi$ should be comprised between 59° and 48°.

Condition 2

Supposing that the magnetic flux density $B_0$ at the center O of the piping is smaller than 80% of the maximum magnetic flux density $B_m$, the fidelity is ±15.3%. This condition is reasonable, if deviations of the maximum magnetic flux density $B_m$ are also taken into account. Consequently the following formula may be valid;

$$0.8 \geq B_0/B_m \tag{12}$$

At the same time the following equations are valid;

$$B_0 = (NI/d)\mu \tag{13}$$

where
NI: Ampere-turn of exciting current,
$\mu$: permeability, and $$B_m = (NI/d \sin\Phi)\mu \tag{14}$$

Inserting these equations in Eq. (12), the following formula is obtained;

$$B_0/B_m = \sin\Phi \leq 0.8 \tag{15}$$

From Eq. (13)

$$\Phi \leq 53°$$

Therefore the region of $\Phi$ satisfying the conditions 1 and 2 is:

$$\Phi = 48°-53°$$

Condition 3

It is supposed that the ratio of the magnetic flux density $B_d$ at the proximity of the detecting electrode to $B_m$ is smaller than 30%. This is because the ratio is about 30% for a position of 0.475d at the neighborhood of the magnetic pole, if it is assumed that the fidelity is smaller than 20% and that the deviation of the maximum magnetic flux density $B_m$ is at 0.335d, which is the upper limit of the tolerance region.

In order to satisfy this condition, the following formulas should be valid just as for the condition 2;

$$\frac{B_d}{B_m} \leq 0.3 \tag{16}$$

$$B_d = \frac{\mu NI}{d \sin\Phi + 2\tan\theta(x - 0.3d) \cdot R} \tag{17}$$

where R is a coefficient representing the fringing effect of the magnetic pole, which is about 2, and the denominator of Eq. (17) represents the path length of the magnetic flux. Inserting Eqs. (14) and (17) in the formula (16), the following formular is obtained;

$$0.3 \geq \frac{d \sin\Phi}{d \sin\Phi + 2\tan\theta \cdot (x - 0.3d) \cdot R}$$
$$= \frac{d \sin\Phi}{d \sin\Phi + 2\tan\theta \cdot (x - 0.3d) \cdot 2}$$

Calculating $\tan\theta$, starting from the above formula;

$$\tan\theta \geq \frac{0.7 \, d \sin\Phi}{1.2(x - 0.3d)} \tag{18}$$

Inserting $\Phi = 53°$ (Although $48° \leq \Phi \leq 53°$, supposing $\Phi = 53°$ as an example) and $x = d/2$ therein, $$\tan\theta \geq \frac{0.56d}{0.24d},$$

from which $\theta \geq 66.8°$ can be obtained.

As explained above, since a magnetic flux density distribution satisfying the 3 conditions described above can be obtained by using an angle $\Phi$ formed by the line OP connecting the edge P of the magnetic pole and the center O of the piping and OD, $\Phi = 48°-53°$, and an angle $\theta$ formed by the side surface PY of the magnetic pole and OD, $\theta \geq 66.8°$, in the embodiment of this invention, as indicated in FIG. 1, the magnetic poles are so shaped that their edges are adjacent to the external periphery of the piping 1 and that the side surface corresponding to the detecting electrode 2 is determined by $\Phi = 48° = 53°$ and $\theta \geq 66.8°$.

Further it is a matter of course that the conditions concerning $\Phi$ and $\theta$ are invariable, even if the diameter d varies. FIG. 2 is a graph showing the result obtained by measuring the magnetic flux density distribution of the magnetic circuit in the detector according to this invention.

I claim:

1. A detector for an electromagnetic flowmeter comprising:
   a pair of detecting electrodes disposed opposite to each other on the inner surface of a piping, through which fluid, whose flow rate is to be measured, flows; and
   magnet means forming a magnetic field in the direction perpendicular both to the axis of said piping and to the line connecting said detecting electrodes, said magnet means having a pair of magnetic poles, which are so formed that the magnetic flux density is greatest in the neighborhood of the position apart from the middle point of the straight line segment connecting said detecting electrodes by 0.3d in the direction towards each of said detecting electrodes, d being the inner diameter of said piping.

2. A detector for an electromagnetic flowmeter according to claim 1, wherein said magnetic poles are formed so as to be arcs along the outer periphery of said piping.

3. A detector for an electromagnetic flowmeter according to claim 2, wherein said arcs are formed along the periphery of a circle, whose center is substantially in accordance with the center of said piping.

4. A detector for an electromagnetic flowmeter according to claim 3, wherein said magnetic poles are so formed that the angle Φ formed by the line connecting said detecting electrodes and the line connecting an edge along the peripheral direction of one of said magnetic poles and the center of said piping is between 48° and 53°.

5. A detector for an electromagnetic flowmeter according to claim 3, wherein the angle $\theta$ formed by the line connecting said detecting electrodes and a side surface of the magnetic poles is greater than or equal to 66.8°.

* * * * *